(12) United States Patent
Stolz et al.

(10) Patent No.: US 12,459,382 B2
(45) Date of Patent: Nov. 4, 2025

(54) METHOD FOR OPERATING A TRANSPORTATION VEHICLE

(71) Applicants: VOLKSWAGEN AKTIENGESELLSCHAFT, Wolfsburg (DE); AUDI AG, Ingolstadt (DE)

(72) Inventors: Markus Stolz, Rühen (DE); Oliver Wintzheimer, Ingolstadt (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 223 days.

(21) Appl. No.: 18/366,879

(22) Filed: Aug. 8, 2023

(65) Prior Publication Data

US 2024/0051412 A1 Feb. 15, 2024

(30) Foreign Application Priority Data

Aug. 9, 2022 (DE) ...................... 10 2022 208 288.5

(51) Int. Cl.
*B60L 53/20* (2019.01)
*H02M 3/158* (2006.01)

(52) U.S. Cl.
CPC ............. *B60L 53/20* (2019.02); *H02M 3/158* (2013.01); *B60L 2210/10* (2013.01)

(58) Field of Classification Search
CPC .... B60L 53/20; B60L 2210/10; B60L 3/0023; B60L 3/12; B60L 2210/12; B60L 2210/14; B60L 53/62; B60L 2240/547; B60L 53/11; B60L 58/19; B60L 58/10; B60L 1/00; B60L 58/18; B60L 58/20; H02M 3/158; B60R 16/03; B60R 16/0315;

(Continued)

(56) References Cited

U.S. PATENT DOCUMENTS

| 2008/0072859 | A1* | 3/2008 | Esaka | H02J 7/0019 320/117 |
| 2015/0377979 | A1 | 12/2015 | Barth et al. | |
| 2019/0229541 | A1* | 7/2019 | Ono | B60L 58/19 |

(Continued)

FOREIGN PATENT DOCUMENTS

DE 102020214725 B3 5/2022

*Primary Examiner* — Lincoln D Donovan
*Assistant Examiner* — Alex W Lam
(74) *Attorney, Agent, or Firm* — Barnes & Thornburg LLP (57) ABSTRACT

A method for operating a transportation vehicle having a high-voltage on-board electrical system and a low-voltage on-board electrical system connected by a DC-to-DC converter. The high-voltage on-board electrical system is connected by a switching unit to a battery unit having two subregions able to be connected electrically in series and electrically in parallel by an interconnection unit. In the method, the switching unit is opened, and the subregions are connected electrically in parallel by the interconnection unit. Electrical energy is channeled from the high-voltage on-board electrical system to the low-voltage on-board electrical system by the DC-to-DC converter reducing the voltage of the high-voltage on-board electrical system. In response to the voltage of the high-voltage on-board electrical system differing from the voltage present at the battery unit by no more than a tolerance value, the switching unit is closed. Also disclosed is a transportation vehicle and a computer program product.

18 Claims, 2 Drawing Sheets

(58) Field of Classification Search
CPC ..... B60R 16/033; H02J 7/0013; H02J 7/0031; H02J 7/0063; H02J 7/0068; H02J 7/007
See application file for complete search history.

(56) References Cited

U.S. PATENT DOCUMENTS

2020/0274370 A1\* 8/2020 Krieg ........................ H02J 7/36
2020/0328593 A1\* 10/2020 Goetz ....................... H02J 1/02
2022/0231537 A1\* 7/2022 Hirota ....................... H02J 7/16

\* cited by examiner

METHOD FOR OPERATING A TRANSPORTATION VEHICLE

PRIORITY CLAIM

This patent application claims priority to German Patent Application No. 10 2022 208 288.5, filed 9 Aug. 2022, the disclosure of which is incorporated herein by reference in its entirety.

SUMMARY

Illustrative embodiments relate to a method for operating a transportation vehicle that comprises a high-voltage on-board electrical system and a low-voltage on-board electrical system, which are connected by a DC-to-DC converter. Illustrative embodiments also relate to a transportation vehicle and to a computer program product.

BRIEF DESCRIPTION OF THE DRAWINGS

Disclosed embodiments are explained in more detail below with reference to the drawings, in which.

DETAILED DESCRIPTION

Transportation vehicles, such as passenger cars, have a main drive for the propulsion, wherein the main drive increasingly comprises an electric motor. In this case, solely one or more electric motors is/are used for the propulsion of the transportation vehicle, for example, with the result that the transportation vehicle is configured as an electric vehicle. As an alternative to this, the transportation vehicle additionally also comprises an internal combustion engine.

A high-voltage on-board electrical system that is fed by a battery unit, such as a high-voltage battery, is conventionally used to energize the electric motor. The high-voltage battery itself has a plurality of battery modules that are usually structurally identical to one another. Each of the battery modules in turn has a plurality of individual batteries, some of which are connected electrically in series and some electrically in parallel. A DC voltage that is the same as or multiple times that of one of the batteries is therefore provided by each of the battery modules.

A charging column is conventionally used for charging the high-voltage battery. A DC voltage, conventionally 400 V, is conventionally provided by the charging column. For a charging time to be comparatively short even if the high-voltage battery has a comparatively large capacity, it is necessary for a comparatively large electric current to be fed from the charging column into the transportation vehicle. As a result, it is necessary for the individual components of the transportation vehicle to be suited to the comparatively large electric current, in particular, for a line cross section to be increased, so that electrical losses are not excessive. This increases the weight of the transportation vehicle and the production costs.

Alternatively to this, it is possible to increase the voltage provided by the charging column, and therefore to shorten the charging time. In this case, a DC voltage of 800 V is usually used. This has the benefit that the electric currents carried during operation of the transportation vehicle are comparatively small, with the result that a cross section and thus a weight of the lines used, and therefore also production costs, can be reduced. Since the individual components of the transportation vehicle are matched to the increased voltage, it is, however, no longer possible to use charging columns, by which only 400 V are provided.

To remedy this, it is known practice to use an interconnection unit, which is a constituent part of the battery unit, and to divide the battery modules equally between two subunits. By the interconnection unit, it is possible in this case to connect the subunits either electrically in parallel or electrically in series. When the transportation vehicle is moved, i.e., is used, the subunits are connected electrically in series, with the result that 800 V are provided by the battery unit and carried by the high-voltage on-board electrical system. This setting of the interconnection unit is maintained as long as a charging column by which 800 V are provided is used for the charging.

If a charging column by which only 400 V are provided is intended to be used, the battery unit is initially disconnected from the high-voltage on-board electrical system and the interconnection unit is set in such a way that the subunits are connected electrically in parallel. Renewed connection to the high-voltage on-board electrical system is not possible in this case on account of the comparatively large voltage difference, and would lead to the individual component parts being overloaded. It is therefore necessary to reduce the voltage carried by the high-voltage on-board electrical system to 400 V. For this purpose, the voltage remaining in the high-voltage on-board electrical system can be reduced by an electrical resistor that is activated for this purpose. If the 400 V are present in the high-voltage on-board electrical system, the high-voltage battery is activated again, and the charging operation can be started.

In this procedure, the excess electrical energy in the high-voltage on-board electrical system is converted into lost heat, which results in decreased efficiency. The target voltage of 400 V is also only able to be set comparatively inaccurately by the electrical resistor, with the result that a voltage difference can still prevail upon connection of the battery unit, which results in the individual component parts being loaded.

The disclosed embodiments specify a particularly suitable method for operating a transportation vehicle and a particularly suitable transportation vehicle, and also a particularly suitable computer program product, wherein efficiency and/or comfort are increased, and wherein operating costs are expediently reduced.

This is achieved by a method, a transportation vehicle, and a computer program product.

The method is used to operate a transportation vehicle. The transportation vehicle may be land-based and may have a number of wheels, at least one, optionally multiple, or all of which are driven by a main drive. By way of example, the main drive is configured so as to be completely electric, and the transportation vehicle is an electric vehicle, for example. As an alternative, the drive additionally has an internal combustion engine, with the result that the transportation vehicle is configured as a hybrid transportation vehicle. One, optionally multiple, of the wheels is/are suitably configured so as to be controllable. It is therefore possible to move the transportation vehicle independently of a particular roadway, for example, rails or the like. It is expediently possible in this case to position the transportation vehicle essentially as desired on a roadway that is made from an asphalt, a tar or concrete. By way of example, the transportation vehicle is a commercial transportation vehicle, such as a truck or a bus. The transportation vehicle may be a passenger car, however.

The transportation vehicle has a high-voltage on-board electrical system. In particular, the high-voltage on-board electrical system is used to operate the possible main drive that is coupled to the high-voltage on-board electrical system for this purpose as appropriate. In particular, the high-voltage on-board electrical system has a capacitor, or a capacitor is at least assigned to the high-voltage on-board electrical system, by which a voltage stabilization is effected. A comparatively stable voltage is therefore provided even if the component parts of the transportation vehicle, which are supplied with power by the high-voltage on-board electrical system, are operated differently. At least, however, components, such as the main drive and/or possible auxiliary units, which are operated by the high-voltage on-board electrical system have a capacitor for stabilizing the voltage used in each case, which capacitors consequently have a retroactive effect on the high-voltage on-board electrical system and are assigned thereto.

The transportation vehicle comprises a battery unit that is an electrical energy storage unit. Optionally, the battery unit is, or comprises, a high-voltage battery. The battery unit comprises two connections that are used to make electrical contact with further constituent parts. The connections are provided and designed for this purpose. In particular, a particular DC voltage is present between the connections during operation. The battery unit comprises two subregions that are also referred to as battery strings. By way of example, each of the subregions comprises, and is, for example, formed of one or more batteries. Optionally, each subregion comprises one or more battery modules, which each comprise multiple batteries. In this case, the batteries of each battery module are connected electrically in series and/or in parallel, with the result that a particular DC voltage is provided by each battery module. For example, the battery modules are structurally identical to one another, which reduces production costs. The battery modules of the subregions are expediently connected electrically in series, with the result that each subregion provides multiple times the voltage than that provided by each of the battery modules. Alternatively, or in combination with this, at least some of the battery modules of each subregion are connected electrically in parallel. In particular, each of the subregions is formed by the corresponding battery modules. The two subregions may be structurally identical to one another.

The battery unit also comprises an interconnection unit that comprises multiple switches, such as contactors. In this case, the interconnection unit is used to interconnect the subregions and to make electrical contact between the subregions and the connections. In this case, the switches are arranged in such a way that, depending on the setting of the switches, the subregions are connected electrically in parallel or electrically in series between the connections. In other words, it is possible to connect the subregions electrically in parallel or electrically in series by actuating the interconnection unit, in particular, by one, multiple, or all of the switches of the interconnection unit. As a result, the voltage present at the connections is the DC voltage, is equal to the voltage that is provided by one of the subregions, or is double this, in particular, if the two subregions are structurally identical to one another. In summary, the voltage present at the connections of the battery unit is dependent on the setting/actuation of the interconnection unit, and it is possible to set the voltage provided by the battery unit or at least the voltage present at the connections. In particular, the voltage present at the connections is either 400 V or 800 V, depending on the setting of the interconnection unit.

The high-voltage on-board electrical system is connected via a switching unit to the battery unit, by which it is expediently possible to produce or to interrupt electrical contact between the high-voltage on-board electrical system and the battery unit. The switching unit has two switches, wherein in each case one of the switches is assigned to each of the connections of the battery unit, the switches being configured as contactors. At least, however, a corresponding switch is assigned to one of the connections of the battery unit. Therefore, electrical contact between the battery unit and the high-voltage on-board electrical system is interrupted when the switching unit is opened. If the switching unit is closed, i.e., the battery unit is in electrical contact with the high-voltage on-board electrical system, a transfer of electrical energy between the battery unit and the high-voltage on-board electrical system is possible, wherein, for example, the high-voltage on-board electrical system is fed by the battery unit, or wherein, for example, electrical energy is transferred from the high-voltage on-board electrical system to the battery unit, in particular, in a regenerative mode of the possible main drive, such as recuperation. In particular, if the switching unit is closed, the voltage present at the high-voltage on-board electrical system is equal to the voltage provided by the battery unit, that is to say to the voltage present between the connections of the battery unit. Expediently, a fuse or the like is additionally assigned to the switching unit, with the result that the battery unit can be disconnected from the high-voltage on-board electrical system in the case of a malfunction of the battery unit.

The transportation vehicle also comprises a low-voltage on-board electrical system, wherein a voltage, optionally a DC voltage, that is reduced in comparison with that of the high-voltage on-board electrical system is carried by the low-voltage on-board electrical system. The voltage of the low-voltage on-board electrical system is 12 V, 24 V or 48 V.

The high-voltage on-board electrical system and the low-voltage on-board electrical system are electrically connected by a DC-to-DC converter, with the result that electrical energy can be exchanged between the high-voltage on-board electrical system and the low-voltage on-board electrical system by the DC-to-DC converter. For this purpose, the DC-to-DC converter may be operated as either a step-up converter or a step-down converter. By way of example, the DC-to-DC converter has a step-up converter and a step-down converter, or it has a bridge circuit with different switches, for example. The DC-to-DC converter is expediently configured as a cascaded/stepped buck-boost converter.

The method makes provision for the switching unit to be opened, with the result that electrical contact between the battery unit and the high-voltage on-board electrical system is ended. The method is therefore carried out only if the switching unit is initially closed, that is to say the high-voltage on-board electrical system is in electrical contact with the battery unit. Due to the opening of the switching unit, it is subsequently not necessary for the same voltage to be present in the high-voltage on-board electrical system and at the connections of the battery unit.

The subregions are subsequently connected electrically in parallel by the interconnection unit. In particular, the method is therefore carried out only if the subregions were previously initially connected electrically in series. In accordance with the method, the interconnection of the subregions is therefore optionally changed, in particular, in such a way that a reduced voltage is now present at the battery unit. In summary, the interconnection unit is set in such a way that the voltage present at the battery unit is reduced, in particular, also in comparison with the voltage still present in the high-voltage on-board electrical system, which, for example, is still unchanged on account of the possible capacitors situated therein, or is at least even greater.

In a further work operation, electrical energy is channeled from the high-voltage on-board electrical system to the low-voltage on-board electrical system by the DC-to-DC converter, with the result that the voltage of the high-voltage on-board electrical system is reduced. In other words, the voltage present in the high-voltage on-board electrical system is reduced, and the DC-to-DC converter is operated in the manner of a buck converter. In summary, electrical energy is therefore transferred from the high-voltage on-board electrical system to the low-voltage on-board electrical system by the DC-to-DC converter, wherein further feeding of electrical energy into the high-voltage on-board electrical system by the battery unit is not possible due to the open switching unit. As a result, the voltage present in the high-voltage on-board electrical system is reduced. Due to the configuration of the DC-to-DC converter, it is not possible in this case to lower the voltage present in the high-voltage on-board electrical system as desired, and it is not possible, for example, to use the DC-to-DC converter to reduce the voltage present in the high-voltage on-board electrical system to below 100 V. By way of example, the DC-to-DC converter is configured in such a manner. Production costs of the DC-to-DC converter are therefore reduced.

If the voltage of the high-voltage on-board electrical system differs from the voltage present at the battery unit by no more than a tolerance value, the switching unit is closed, with the result that the high-voltage on-board electrical system is in turn fed by the battery unit. Expediently, at least as soon as the switching unit has been closed, the transfer of the electrical energy from the high-voltage on-board electrical system to the low-voltage on-board electrical system is ended, if this is still the case. The tolerance value is expediently matched to the component parts of the high-voltage on-board electrical system, of the low-voltage on-board electrical system, of the DC-to-DC converter, of the switching unit, of the battery unit and/or of other constituent parts of the transportation vehicle. Expediently, the tolerance value is less than 20 V and, for example, greater than 5 V, and the tolerance value is essentially equal to 10 V, wherein there is a deviation of 5 V, 2 V or 0 V, for example.

It is therefore possible, due to the method, to reduce the voltage carried by the high-voltage on-board electrical system within a comparatively short period of time, namely to the DC voltage that is only provided by one of the subregions. In particular, it is therefore possible to change the operating mode of the transportation vehicle, wherein, on account of the comparatively short period of time, there are no losses during use and therefore to convenience for users. The operating mode is also changed comparatively quickly if this is initiated directly or implicitly by the user. Convenience is therefore likewise increased. On account of the excess electrical energy in the high-voltage on-board electrical system being fed into the low-voltage on-board electrical system, this energy can be used in an extended manner, which reduces losses, and efficiency is therefore increased. Operating costs are therefore also reduced, especially since the electrical energy is still available in the low-voltage on-board electrical system. The energy is used there, for example, to charge a possible battery assigned to the low-voltage on-board electrical system or to feed an auxiliary unit operated by the low-voltage on-board electrical system.

In particular, the transportation vehicle comprises a control device that, for example, is a constituent part of the battery unit or is separate from this. The method may be carried out at least in part by the control device, and the control device is suitable, in particular, is provided and designed, for this purpose. The interconnection unit is expediently set, and therefore actuated, by the control device. The control device is suitable, in particular, is provided and designed, for this purpose. By way of example, the control device is, or comprises, an application-specific circuit (ASIC). Alternatively to this, the control device comprises a computer, such as a microprocessor, for example.

As soon as the switching unit has been closed, possible further DC-to-DC converters, such as a power converter, which are operated by the high-voltage on-board electrical system and by which auxiliary units fed by the high-voltage on-board electrical system are operated, are, for example, operated in another operating mode, with the result that further operation of the auxiliary units is possible despite the reduced voltage of the high-voltage on-board electrical system.

By way of example, the DC-to-DC converter is operated in such a way that the speed of the energy transfer is at a maximum, with the result that the time at which the switching unit can be closed again, and at which the voltage of the high-voltage on-board electrical system differs from the voltage present at the battery unit by less than the tolerance value, is reached comparatively quickly. Optionally, however, if the voltage of the high-voltage on-board electrical system approaches the voltage present at the battery unit, the speed of the energy transfer by the DC-to-DC converter is reduced. In this case, for example, after the switching unit has been opened, the DC-to-DC converter is initially operated in such a way that the speed of the energy transfer is at a maximum. By way of example, the speed is reduced as soon as the voltage present in the high-voltage on-board electrical system differs from the voltage provided by the battery unit by less than 100 V or 50 V. By way of example, the speed in this case is reduced in stages, wherein there are, for example, 2, 3 or more (speed) stages, wherein the number of stages is expediently fewer than 10. Alternatively to this, the reduction takes place continuously.

Due to the speed of the energy transfer being reduced, the speed of the change of the voltage carried by the high-voltage on-board electrical system is therefore also reduced. As a result, the time period in which the voltage carried by the high-voltage on-board electrical system differs from the voltage of the battery unit by less than the tolerance value is lengthened. There is therefore more time available for closing the switching unit, and the formation of an excessive voltage difference between the battery unit and the high-voltage on-board electrical system until the switching unit is closed is avoided even if electrical energy still continues to be dissipated from the high-voltage on-board electrical system, for example, due to losses, such as a self-discharge of the possible capacitor that is assigned to the high-voltage on-board electrical system, or due to an auxiliary unit operated by the high-voltage on-board electrical system. Loading of the individual component parts is therefore reduced and the service life of these is therefore increased.

By way of example, the DC-to-DC converter is only operated in such a way that it is used to feed the electrical energy from the high-voltage on-board electrical system into the low-voltage on-board electrical system, and as soon as the voltage carried by the high-voltage on-board electrical system is greater than the voltage provided by the battery unit only by the tolerance value, the switching unit is closed. Optionally, however, electrical energy is initially channeled from the high-voltage on-board electrical system to the low-voltage on-board electrical system by the DC-to-DC converter until the voltage of the high-voltage on-board electrical system, that is to say the voltage carried by, and present at, the high-voltage on-board electrical system, is lower than the voltage present at the battery unit. In particular, the electrical energy is transferred until the voltage of the high-voltage on-board electrical system is lower than the voltage present at the battery unit by more than a limit value, wherein the limit value is greater than 20 V or 15 V, for example. Electrical energy is subsequently channeled from the low-voltage on-board electrical system to the high-voltage on-board electrical system by the DC-to-DC converter, with the result that the voltage of the high-voltage on-board electrical system rises again. In other words, the voltage present in, and carried by, the high-voltage on-board electrical system rises again. For this purpose, the DC-to-DC converter is operated as a step-up converter. If the voltage of the high-voltage on-board electrical system differs from the voltage present at the battery unit by no more than the tolerance value, the switching unit is closed. In this case, however, the voltage of the high-voltage on-board electrical system approaches the voltage present at the battery unit from below. On account of self-discharge or, for example, auxiliary units operated by the high-voltage on-board electrical system, the voltage of the high-voltage on-board electrical system decreases as soon as the switching unit is open, even if the DC-to-DC converter is deactivated. In connection with the energy transfer from the high-voltage on-board electrical system to the low-voltage on-board electrical system by the DC-to-DC converter, this effect causes a comparatively quick decrease in the voltage of the high-voltage on-board electrical system, with the result that, while the voltage of the battery unit is being approached from above, the time period in which the voltage carried by the high-voltage on-board electrical system differs from the voltage of the battery unit by less than the tolerance value is comparatively short. If the voltage of the high-voltage on-board electrical system approaches the voltage of the battery unit from below, the effect is compensated for by the transfer of electrical energy from the low-voltage on-board electrical system, with the result that the time period is lengthened. It can therefore be ensured that the switching unit is also actually completely closed if the two voltages differ by less than the tolerance value. Loading of the component parts is therefore further reduced.

By way of example, in this case the transfer of electrical energy is ended as soon as the two voltages differ by less than the tolerance value. Optionally, however, electrical energy is channeled from the low-voltage on-board electrical system to the high-voltage on-board electrical system by the DC-to-DC converter until the switching unit is closed. Optionally, in this case, the voltage of the high-voltage on-board electrical system is initially stabilized by the DC-to-DC converter, with the result that the voltage no longer changes if the voltage of the high-voltage on-board electrical system differs from the voltage present at the battery unit by no more than the tolerance value. Only then is the switching unit actuated and closed. It is therefore ensured, by the DC-to-DC converter, that there are no further changes to the voltage of the high-voltage on-board electrical system if the switching unit has started to be closed or at least if the two voltages differ by less than the tolerance value. Possible losses or self-discharge are therefore further compensated for by the DC-to-DC converter until the high-voltage on-board electrical system is fed by the battery unit. Consequently, a formation of voltage differences is avoided, or these are at least further reduced, and loading is further reduced. The voltage differences are therefore lower than 1 V or 0.5 V.

In particular, in the meantime, the resulting electric current from the low-voltage on-board electrical system to the high-voltage on-board electrical system is detected, optionally while the voltage of the high-voltage on-board electrical system is stabilized by the DC-to-DC converter. In other words, the electric current that results on account of the energy transfer for equalization purposes is detected, with the result that the voltage of the high-voltage on-board electrical system does not change, in particular, if the voltage differs from the voltage of the battery unit by less than the tolerance value. The detection is expediently carried out by the DC-to-DC converter.

A diagnosis is suitably carried out on the basis of the detected electric current. In other words, the value of the detected electric current is used for a diagnosis. By way of example, the electric current is compared with a predetermined value that is established, for example, on account of a self-discharge, such as 0.5 A. If the electric current is greater, an auxiliary unit is operated by the high-voltage on-board electrical system, for example, or there is a short circuit. Alternatively, or in combination with this, the time period that is required until the voltage of the high-voltage on-board electrical system differs from the voltage present at the battery unit by no more than the tolerance value is used for the diagnosis. By way of example, in this case, the voltage of the battery unit is only reached from above, that is to say only by the energy transfer from the high-voltage on-board electrical system to the low-voltage on-board electrical system, or this diagnosis is also carried out in the case where the voltage of the high-voltage on-board electrical system is initially further reduced, in particular, until the voltage of the high-voltage on-board electrical system falls below the voltage of the battery unit by more than the possible limit value. If the time period is shorter than a predetermined value or the average of the last time periods from previous performances of the method, a line of the high-voltage on-board electrical system is detached, for example. If the time period is longer, in particular, if the voltage of the battery unit is approached from below, there is a short circuit. On the basis of the diagnosis, a further function may be carried out, for example, a message is output and/or an operating mode is selected. For example, if a malfunction in one of the subregions has been identified on the basis of the diagnosis, subsequently only the other one of the subregions is used to feed the high-voltage on-board electrical system. In this case, for example, the possible main drive is operated with the reduced voltage, meaning that it is still possible to move the transportation vehicle despite the malfunction/fault.

The transportation vehicle may comprise a charging connection. In particular, the charging connection is inserted into a body of the transportation vehicle and, for example, closed by a pivotable cover. The charging connection is used to connect to an external charging infrastructure and is suitable, in particular, is provided and designed, for this purpose. By way of example, the charging connection has multiple contacts for this purpose, expediently at least two. In this case, in particular, in each case one of the possible poles of the high-voltage on-board electrical system is assigned to each of the contacts. In particular, the charging connection is electrically connected to the high-voltage on-board electrical system via a connection unit, with the result that a flow of electric current between the charging connection and the high-voltage on-board electrical system is possible at least in some cases. The connection unit in this case has one or more switches, wherein one of the switches, which, for example, are configured as contactors, is expediently assigned to each of the poles of the high-voltage on-board electrical system. Therefore, the connection unit may comprise one or more charging contactors. By way of example, the charging connection is configured as a plug, or has a cable. Expediently, the charging connection complies with a particular standard, for example, that of type 1 or 2. In particular, the charging connection has a locking method or mechanism, with the result that it is possible to connect a cable to the charging connection, wherein undesired detachment is avoided on account of the locking method or mechanism.

According to one development, after the switching unit has been closed, electrical contact is made between the high-voltage on-board electrical system and the charging connection. For this purpose, in particular, the connection unit is closed, with the result that a flow of electric current between the charging connection and the high-voltage on-board electrical system is possible. It is therefore possible to charge the battery unit via the charging connection and the high-voltage on-board electrical system. In particular, in this case, a DC voltage of 400 V is provided via the charging connection, and the method is carried out if the DC voltage of 400 V is present at the charging connection. In contrast, if 800 V, for example, are present at the charging connection, the method is not carried out, or at least the switching unit is not opened, and the subregions are connected electrically in series or remain in this interconnection. In other words, the subregions are connected in parallel only if a reduced voltage, which is lower than the present voltage of the high-voltage on-board electrical system, is present at the charging connection and if the battery unit is intended to be charged. As soon as the electrical contact has been made with the charging connection, in particular, a charging operation is started, with the result that electrical energy is fed into the transportation vehicle, in particular, the battery unit. On account of the method, it is therefore possible to use a wide variety of charging infrastructures, by which different voltage levels are therefore provided. Therefore, flexibility during use of the transportation vehicle is increased, and convenience is increased.

In one development, a rectifier is integrated in the connection unit, for example, by which rectifier an AC voltage present at the charging connection is rectified. In this case, the rectifier is only operated if an AC voltage is present at the charging connection. Otherwise, that is to say if a DC voltage is present there, the rectifier is not operated.

When the feeding-in of electrical energy via the charging connection has ended, in particular, the electrical connection to the charging connection is interrupted and the electrical contact is expediently ended, for which purpose the possible connection unit is actuated, for example. Risk-free removal of a possible charging cable or the like is therefore possible for a user. In addition, the switching unit is subsequently initially opened, and the subregions are connected electrically in series by the interconnection unit. In addition, electrical energy is expediently channeled from the low-voltage on-board electrical system to the high-voltage on-board electrical system by the DC-to-DC converter, with the result that the voltage of the high-voltage on-board electrical system is increased. If the voltage differs from the voltage of the battery unit by less than a further tolerance value, such as 10 V, the switching unit is closed again, and the transportation vehicle can therefore be used in the same way as before the method was carried out.

By way of example, the transportation vehicle is a passenger car, a truck or a bus. In a further alternative, the transportation vehicle is an industrial truck. The transportation vehicle has a high-voltage on-board electrical system. In this case, the high-voltage on-board electrical system is suitable, in particular, is provided and designed, for carrying a DC voltage that is expediently greater than 200 V, 300 V or 350 V. In particular, the high-voltage on-board electrical system is configured in such a way that different voltage levels can be present at the high-voltage on-board electrical system. Suitably, the transportation vehicle comprises an electric motor that is used for the propulsion of the transportation vehicle and that is fed by the high-voltage on-board electrical system, optionally via a power converter. The transportation vehicle is, therefore, optionally an electric vehicle. The transportation vehicle expediently comprises one or more auxiliary units, such as an air-conditioning compressor, which is likewise operated by the high-voltage on-board electrical system.

The transportation vehicle also has a low-voltage on-board electrical system that is suitable, in particular, is provided and designed, for carrying a voltage, namely a DC voltage, that is reduced in comparison with that of the high-voltage on-board electrical system. In this case, the voltage is suitably 12 V, 24 V or 48 V. In particular, one or more auxiliary units of the transportation vehicle, which, for example, are used for convenience, such as, for example, a multimedia system or an on-board computer, are operated by the low-voltage on-board electrical system.

The high-voltage on-board electrical system and the low-voltage on-board electrical system are connected by a DC-to-DC converter and are therefore in electrical contact with one another. By the DC-to-DC converter, it is possible in this case to transfer electrical energy from the high-voltage on-board electrical system to the low-voltage on-board electrical system, such that the DC-to-DC converter functions as a step-down converter. For this purpose, the voltage present in the high-voltage on-board electrical system is transferred to a voltage level that corresponds to that of the voltage present in the low-voltage on-board electrical system or at least corresponds to the voltage. By way of example, it is therefore possible to charge a battery assigned to the low-voltage on-board electrical system by the high-voltage on-board electrical system. In addition, it is possible to operate the DC-to-DC converter as a step-up converter and to feed electrical energy from the low-voltage on-board electrical system to the high-voltage on-board electrical system. For this purpose, the voltage provided by the low-voltage on-board electrical system is increased, optionally to the voltage carried in the high-voltage on-board electrical system.

The transportation vehicle also comprises a battery unit and a switching unit, wherein the high-voltage on-board electrical system is connected to, that is to say electrically connected to, and therefore in electrical contact with, the battery unit via the switching unit. It is therefore possible to establish or else to interrupt the electrical contact between the battery unit and the high-voltage on-board electrical system by the switching unit, depending on the setting of the switching unit. In particular, for this purpose, the switching unit has one or more switch/es that is/are configured as a contactor, for example. The switching unit expediently comprises a fuse, with the result that the battery unit can be disconnected from the high-voltage on-board electrical system in the case of a malfunction of the battery unit. In particular, the battery unit has two connections, each of which is assigned to a respective one of the electrical potentials of the high-voltage on-board electrical system. Expediently, in this case one of the switches is assigned to each connection of the battery unit or at least to that connection by which the positive electrical potential is provided. In particular, the negative electrical potential of the battery unit is carried electrically to ground, just like the electrical potential of the high-voltage on-board electrical system.

The battery unit has two subregions and an interconnection unit. By way of example, the subregions are structurally identical to one another, and/or the battery unit also has further subregions of this kind. Each subregion comprises one or more batteries that each comprise one or more galvanic elements, for example. In particular, the batteries in this case are configured so as to be rechargeable and therefore are secondary batteries. By way of example, the batteries are divided directly between the subregions, and are connected electrically in parallel and/or in series for this purpose. Alternatively to this, the batteries are combined to form battery modules and are, for example, connected electrically in series and/or in parallel for this purpose. In this case, the battery modules of each subregion are in turn connected electrically in parallel and/or in some cases in series with one another, for example.

Each subregion expediently has two subconnections, at which, during operation, a voltage is present that is predetermined on the basis of the interconnection of the batteries of each subregion. By the interconnection unit, it is possible to connect the two subregions electrically in series or electrically in parallel, with the result that, depending on the interconnection, in particular, either double the voltage provided by each of the subregions or the voltage provided by one of the subregions is present at the connections of the battery unit. In summary, by the interconnection unit, it is therefore possible to connect the subregions either electrically in series or electrically in parallel, in particular, selectively and/or depending on present requirements.

The interconnection unit expediently comprises three switches that are each configured as a contactor, for example. In this case, one of the subconnections of one of the subregions is routed to one of the subconnections of the other subregions via a switch of this kind. In addition, each of these subconnections is routed to in each case one of the connections of the battery unit via in each case one of the remaining switches. It is therefore possible to realize the functionality of the interconnection unit with a comparatively small number of component parts, which is why production costs are reduced.

The transportation vehicle may be configured in such a way that, during normal operation, that is to say when the transportation vehicle is moved or used as intended, the subregions are connected electrically in series. In particular, in this case a voltage of 800 V is present at the battery unit and therefore also at the high-voltage on-board electrical system, and a DC voltage of 400 V is therefore available during normal operation by each subregion.

The transportation vehicle is operated in accordance with a method, in which the switching unit is opened and the subregions are connected electrically in parallel by the interconnection unit. Electrical energy is channeled from the high-voltage on-board electrical system to the low-voltage on-board electrical system by the DC-to-DC converter, with the result that the voltage of the high-voltage on-board electrical system is reduced. If the voltage of the high-voltage on-board electrical system differs from the voltage present at the battery unit by no more than a tolerance value, the switching unit is closed.

The transportation vehicle may comprise a control device that is suitable, expediently is provided and designed, for carrying out the method. In this case, the control device is implemented by a single device, for example, or divided between different devices. The disclosed embodiments likewise relate to a control device of this kind. By way of example, the control device is a constituent part of a battery management system. By way of example, the control device is configured as an application-specific circuit (ASIC) or comprises a programmable computer, such as a microprocessor. In particular, the control device comprises an additional storage unit, on which a computer program product is stored, which, when the program is executed by a computer, in particular, the microprocessor, causes the computer to carry out the method.

The computer program product comprises a number of instructions that, when the computer program product, also referred to merely as a program, is executed by a computer, cause the computer to carry out a method for operating a transportation vehicle that comprises a high-voltage on-board electrical system and a low-voltage on-board electrical system, which are connected by a DC-to-DC converter, wherein the high-voltage on-board electrical system is connected via a switching unit to a battery unit that has two subregions that are able to be connected electrically in series and electrically in parallel by an interconnection unit. In this case, the switching unit is opened, and the subregions are connected electrically in parallel by the interconnection unit. Electrical energy is channeled from the high-voltage on-board electrical system to the low-voltage on-board electrical system by the DC-to-DC converter, with the result that the voltage of the high-voltage on-board electrical system is reduced. If the voltage of the high-voltage on-board electrical system differs from the voltage present at the battery unit by no more than a tolerance value, the switching unit is closed.

The computer is expediently a constituent part of a control device or electronics and, for example, is formed by methods or mechanisms thereof. The computer optionally comprises, or is formed by, a microprocessor. By way of example, the computer program product is a file or a data carrier that contains an executable program that automatically carries out the method when it is installed on a computer.

The disclosed embodiments also relates to a storage medium, on which the computer program product is stored. A storage medium of this kind is, for example, a CD-ROM, a DVD or a Blu-Ray disk. Alternatively to this, the storage medium is a USB stick or another storage unit, which, for example, is rewritable or can only be written to once. Such a storage unit is, for example, a flash memory, a RAM or a ROM.

The developments and benefits explained in connection with the method can also be transferred analogously to the transportation vehicle/the control device/the computer program product/the storage medium and also to one another, and vice versa.

Parts that correspond to one another are provided with the same reference signs in all the figures.

Figure 1:
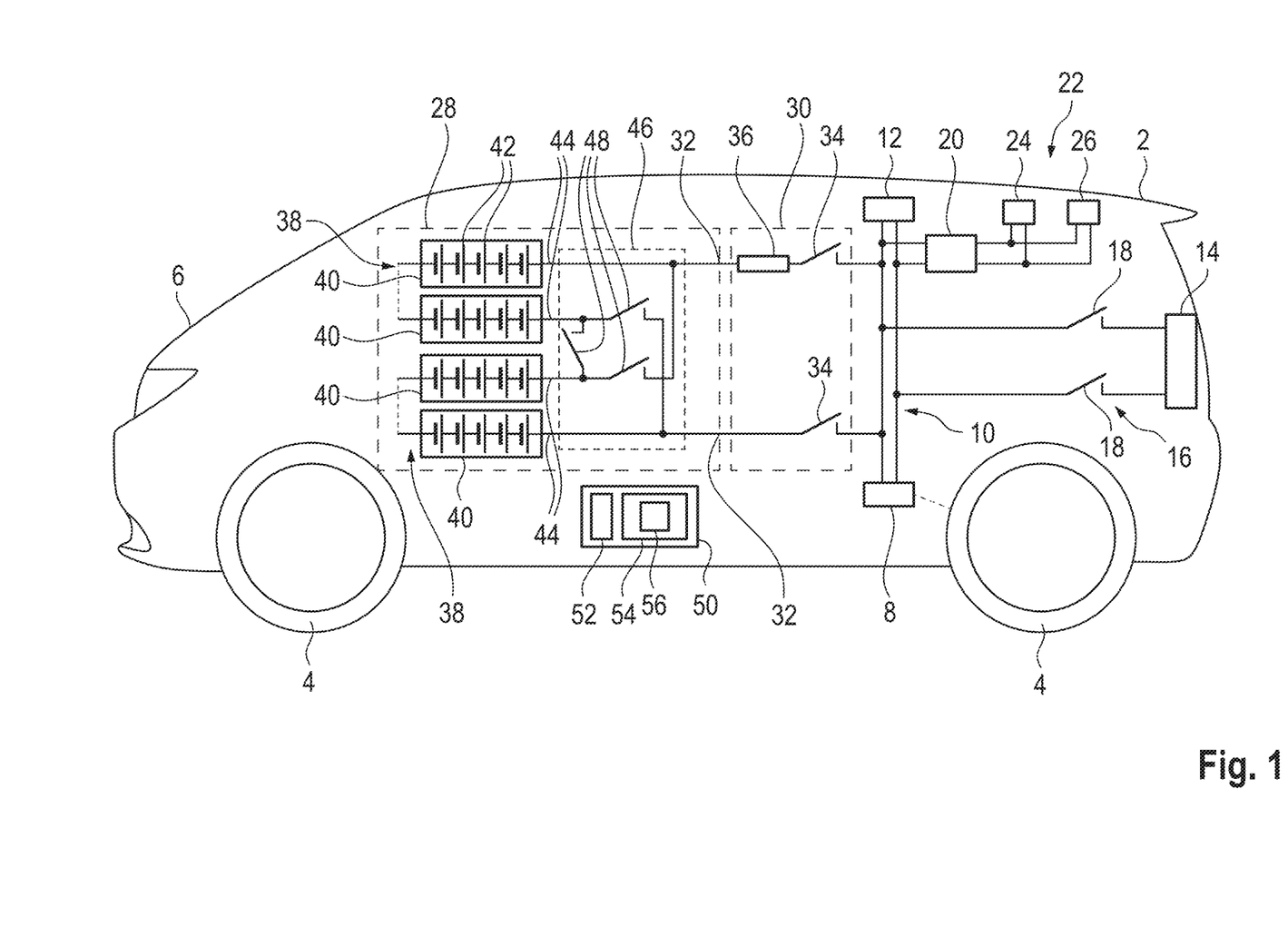
FIG. 1 schematically shows a simplified view of a transportation vehicle.

FIG. 1 shows a schematically simplified view of a transportation vehicle 2, such as a passenger car. The transportation vehicle 2 has multiple wheels 4, by which contact is made with a roadway. The wheels 4 are connected to a body 6 of the transportation vehicle 2 via a chassis, which is not shown in more detail. The transportation vehicle 2 comprises a main drive 8, by which at least some of the wheels 4 are driven. The main drive 8 in this case has an electric motor that is operated by a high-voltage on-board electrical system 10. A first auxiliary unit 12, such as an air-conditioning compressor of an air-conditioning system, is also operated by the high-voltage on-board electrical system. The main drive 8 and the first auxiliary unit 12 are configured such that a DC voltage of 800 V is carried by the high-voltage on-board electrical system 10. The first auxiliary unit 12 and the drive 8 each have multiple capacitors, which are charged during operation via the high-voltage on-board electrical system 10, and which each constitute a local buffer store for the electrical energy required in each case.

The transportation vehicle 2 also comprises a charging connection 14 that is electrically connected to the high-voltage on-board electrical system 10 via a connection unit 16. The connection unit 16 has two charging contactors 18, which therefore constitute switches, and of which in each case one is assigned to one of the electrical potentials of the high-voltage on-board electrical system 10. If the charging contactors 18 are closed, the charging connection 14 is in electrical contact with the high-voltage on-board electrical system 10. In contrast, if the charging contactors 18 are open, the electrical contact is interrupted.

A DC-to-DC converter 20, which is configured as a cascaded/stepped buck-boost converter, is additionally in electrical contact with the high-voltage on-board electrical system 10. A low-voltage on-board electrical system 22 is in electrical contact with the DC-to-DC converter 10, with the result that the low-voltage on-board electrical system 22 is connected to the high-voltage on-board electrical system 10 by the DC-to-DC converter 20. A DC voltage of 48 V is carried during operation, and a second auxiliary unit 24, which is a multimedia system, is operated, by the low-voltage on-board electrical system 22. The low-voltage on-board electrical system 22 is also in electrical contact with a battery 26, by which a DC voltage of 12 V is provided. The low-voltage on-board electrical system 22 is fed by the battery 26 if the DC-to-DC converter 20 is not being operated. However, it is also possible to feed electrical energy from the high-voltage on-board electrical system 10 into the low-voltage on-board electrical system 22 by the DC-to-DC converter 20, with the result that the battery 26 is charged and/or the second auxiliary unit 24 is operated, wherein no energy is drawn from the battery 26.

The transportation vehicle 2 also comprises a battery unit 28 that is electrically connected to the high-voltage on-board electrical system 10 via a switching unit 30. In this case, the battery unit 28 has two connections 32, each of which is routed to one of the electrical potentials of the high-voltage on-board electrical system 10 via a respective contactor 34 of the switching unit 30. In addition, one of the connections 32, namely that one assigned to the positive electrical potential, is routed via a fuse 36 to the assigned contactor 34, with the result that safety is increased.

The battery unit 28 has two subregions 38, wherein each subregion 38 has multiple battery modules 40 that are structurally identical, of which in each case only two are shown per subunit 38. The same number of battery modules 40 is assigned to each of the subregions 38, with the result that the subregions 38 are structurally identical to one another. Each battery module 40 has multiple battery cells 42 or batteries that are formed by galvanic elements that are not shown in more detail. All of the battery modules 40 of each subregion 38 are connected electrically in series between in each case two subconnections 44 of the respective subregion 38.

The battery unit 28 also comprises an interconnection unit 46 that comprises three switches 48, namely contactors. One of the subconnections 44 of one of the subregions 38 is electrically connected to one of the subconnections 44 of the other subregion 38 by one of the switches 48. In this case, these subconnections 44 are electrically connected to one of the connections 32 of the battery unit 28 by in each case one of the remaining switches 48. The remaining subconnections 44 of each subregion 38 are routed directly to one of the connections 32. It is therefore possible, by the interconnection unit 46, namely depending on the setting of the switches 48, to connect the two subregions 38 either electrically in series or electrically in parallel, namely between the connections 32. If the subregions 38 are connected electrically in series, a DC voltage of 800 V is present in this case between the connections 32. This therefore constitutes the voltage of the battery unit 28. In contrast, if the two subregions 38 are connected electrically in parallel, a voltage of 400 V is present at the connections 32. In other words, in this case the voltage of the battery unit 28 is equal to 400 V.

Figure 2:
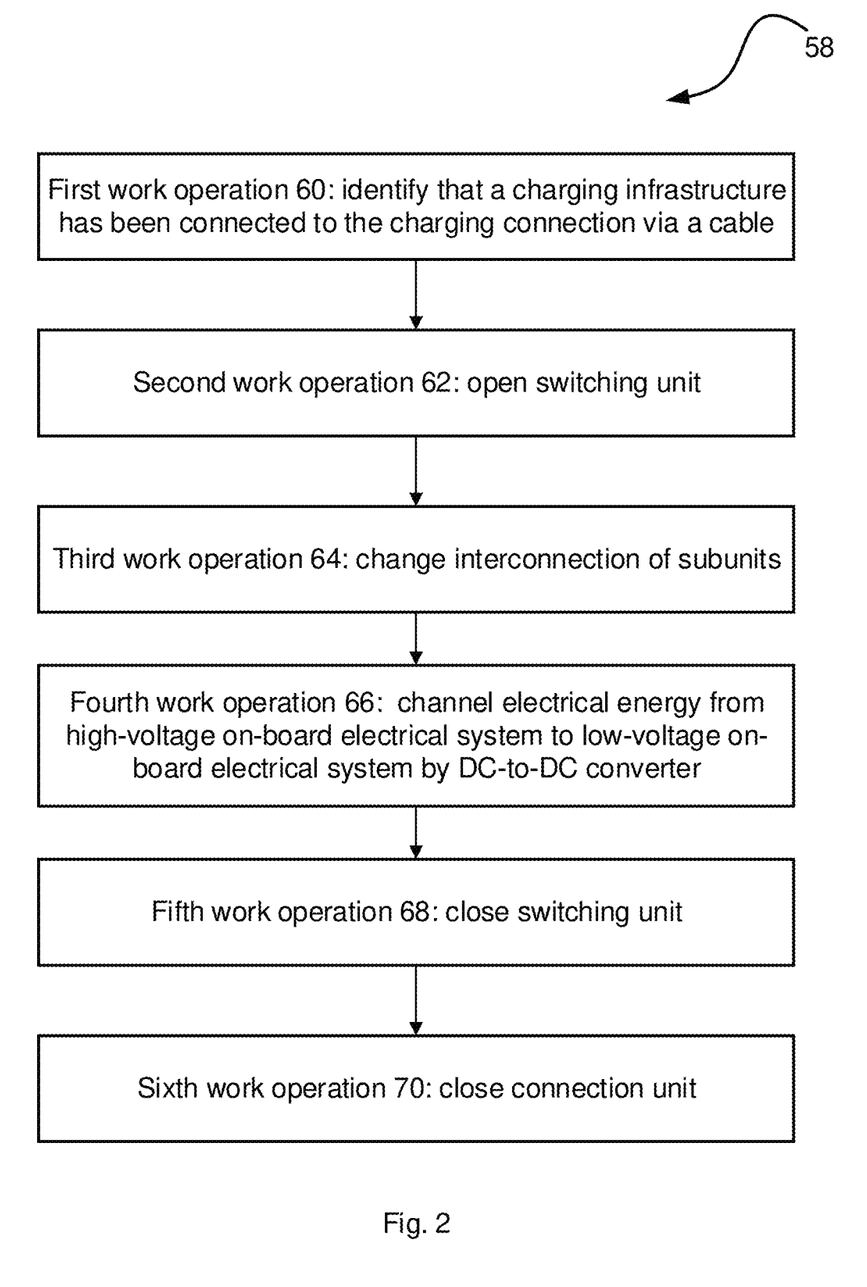
FIG. 2 shows a method for operating the transportation vehicle.

The transportation vehicle 2 also comprises a control device 50, by which the switching unit 30, the battery unit 28, the connection unit 16 and the DC-to-DC converter 20 are operated, or at least are able to be set. The control device 50 comprises a computer 52, such as a programmable microprocessor. In addition, the control device 50 comprises a storage unit 54, on which a computer program product 56 is stored. The computer program product 56 contains multiple instructions that, when the program is executed by the computer 52, cause the computer to carry out a method 58, which is shown in FIG. 2, for operating the transportation vehicle 2. In other words, the transportation vehicle 2 is operated in accordance with the method 58.

In a first work operation at 60, it is identified that a charging infrastructure has been connected to the charging connection 14 via a cable, which is not shown in more detail, by which charging infrastructure a DC voltage of 400 V is provided. In this case, the connection unit 16 is in the open state, with the result that the charging contactors 18 are open, and the charging connection 14 is consequently not in electrical contact with the on-board electrical system 10. It is also determined, by sensors and/or component parts, which are not shown in more detail, that the battery unit 28 should be charged by the charging infrastructure. For this purpose, corresponding signals are transmitted by the charging infrastructure, for example.

Since the main drive 8 and the first auxiliary unit 12 are configured for a supply of 800 V, 800 V are, however, present at the high-voltage on-board electrical system 10 as the voltage, which is provided by the battery unit 28. For this purpose, the interconnection unit 46 is set in such a way that the two subregions 38 are connected electrically in series, and the switching unit 30 is in the closed state, with the result that the battery unit 28 is in electrical contact with the high-voltage on-board electrical system 10. As a result, there is a comparatively large voltage difference between the high-voltage on-board electrical system 10 and the charging connection 14.

In a second work operation at 62, the switching unit 30 is opened. For this purpose, the two contactors 34 are opened, with the result that the electrical contact between the battery unit 28 and the high-voltage on-board electrical system 10 is removed. The 800 V are still present in the high-voltage on-board electrical system 10 and are still maintained on account of the capacitors of the main drive 8 and of the first auxiliary unit 12. On account of a self-discharge thereof, and on account of arising losses, the voltage of the high-voltage on-board electrical system 10 decreases, but initially comparatively slowly.

In a third work operation at 64, which, for example, is carried out simultaneously with, or subsequently to, the second work operation at 62, the interconnection of the subunits 38 is changed. For this purpose, all the switches 48 are initially opened, and two of the switches 48 are subsequently closed, with the result that the two subregions 38 are connected electrically in parallel. In other words, the subregions 38 are connected electrically in parallel by the interconnection unit 46. Therefore, 400 V are also present at the connections 32 of the battery unit 28, just like at the charging connection 14.

In a fourth work operation at 66, which is carried out simultaneously with, or subsequently to, the third work operation at 64, but subsequently to the second work operation at 20, electrical energy is channeled from the high-voltage on-board electrical system 10 to the low-voltage on-board electrical system 22 by the DC-to-DC converter 20. In this case, the battery 26 is, for example, charged by the electrical energy. The voltage of the high-voltage on-board electrical system 10 decreases on account of the transfer of the electrical energy to the low-voltage on-board electrical system 22. In this case, the DC-to-DC converter 20 is initially operated at maximum power, with the result that a comparatively large amount of electrical energy is initially transferred from the high-voltage on-board electrical system 10 to the low-voltage on-board electrical system 22, which is why the voltage of the high-voltage on-board electrical system 10 initially drops comparatively quickly.

If the voltage of the high-voltage on-board electrical system 10 has approached the voltage present at the battery unit 28, that is to say if there is only a voltage difference of 50 V between them, and therefore the voltage of the high-voltage on-board electrical system is 450 V, the speed is continuously reduced, wherein this is carried out in a controlled manner. As soon as the voltage of the high-voltage on-board electrical system 10 differs from the voltage present at the battery unit 28 by no more than a tolerance value, the DC-to-DC converter 20 is stopped and the fourth work operation at 66 is ended. The tolerance value corresponds to 10 V, and the DC-to-DC converter 20 is consequently stopped if a voltage of 410 V is present in the high-voltage on-board electrical system 10.

Immediately after the fourth work operation at 66, a fifth work operation at 68 is carried out, and the switching unit 30 is closed, with the result that the battery unit 28 is again in electrical contact with the high-voltage on-board electrical system 10. Although the DC-to-DC converter 20 is no longer being operated, the voltage of the high-voltage on-board electrical system 10 still continues to decrease on account of the self-discharge until the switching unit 20 is completely closed, and the voltage of the high-voltage on-board electrical system 10 is therefore stabilized by the battery unit 28. Alternatively, the DC-to-DC converter 20 is still operated during the fifth work operation at 68.

As soon as the switching unit 30 has been closed, a sixth work operation at 70 is carried out, in which the connection unit 16 is closed, that is to say the two charging contactors 18. Electrical contact is therefore made between the charging connection 14 and the high-voltage on-board electrical system 10, and the charging operation is started. In this case, electrical energy is fed via the charging connection 14 into the high-voltage on-board electrical system 10, and from there into the battery unit 28. In one development, even before the start of the charging operation, there is initially a voltage equalization between the voltage present at the charging connection 14 and the voltage presently carried by the high-voltage on-board electrical system 10.

As soon as the subregions 38 have been charged, or the cable is removed from the charging connection 14, the switching unit 30 is opened and the interconnection unit 46 is set in such a way that the two subregions 38 are in turn connected electrically in series. Furthermore, electrical energy is channeled from the low-voltage on-board electrical system 22 to the high-voltage on-board electrical system 10 by the DC-to-DC converter 20, for which purpose electrical energy is drawn from the battery 26. The voltage of the high-voltage on-board electrical system 10 rises on account of the energy transfer. If the voltage of the high-voltage on-board electrical system 10 is equal to 800 V, the switching unit 30 is closed, with the result that the battery 28 is again in electrical contact with the high-voltage on-board electrical system 10.

In a further configuration, the DC-to-DC converter 10 initially still continues to be operated in the fourth work operation at 66. In other words, electrical energy still continues to be channeled to the low-voltage on-board electrical system 22 by the DC-to-DC converter 20, although the voltage of the high-voltage on-board electrical system 10 is equal to 410 V. The DC-to-DC converter 20 is operated until the voltage of the high-voltage on-board electrical system 10 is equal to 350 V, that is to say is lower than the voltage of the battery unit 28 by a limit value of 50 V. The mode of operation of the DC-to-DC converter 20 is then changed, and, using the DC-to-DC converter, electrical energy is now channeled from the low-voltage on-board electrical system 22 to the high-voltage on-board electrical system 10, with the result that the voltage of the high-voltage on-board electrical system rises again.

In summary, electrical energy is thus channeled from the high-voltage on-board electrical system 10 to the low-voltage on-board electrical system 22 by the DC-to-DC converter 20 until the voltage of the high-voltage on-board electrical system 10 is lower than the voltage present at the battery unit 28. Electrical energy is subsequently channeled from the low-voltage on-board electrical system 22 to the high-voltage on-board electrical system 10 by the DC-to-DC converter 20, with the result that the voltage of the high-voltage on-board electrical system 10 rises again.

As soon as the voltage of the high-voltage on-board electrical system 10 is in turn 400 V, the speed of the energy transfer is reduced, with the result that the voltage of the high-voltage on-board electrical system 10 is kept constant by the DC-to-DC converter 20 despite the self-discharge. In addition, the electric current carried via the DC-to-DC converter 20 in this case, that is to say the electric current that is necessary for maintaining the voltage of the high-voltage on-board electrical system 10, is detected. In this case too, the switching unit 30 is closed in the fifth work operation at 66, wherein the DC-to-DC converter 20 is operated, and electrical energy is channeled from the low-voltage on-board electrical system 22 to the high-voltage on-board electrical system 10 by the DC-to-DC converter, until the switching unit 30 is completely closed. In this exemplary embodiment, the voltage differences between the battery unit 28 and the high-voltage on-board electrical system 10 are therefore comparatively small, even in the case of a comparatively high energy draw from the high-voltage on-board electrical system 10, for example, on account of an increased self-discharge, which is why loading is reduced.

In addition, a diagnosis is carried out on the basis of the resulting electric current from the low-voltage on-board electrical system 22 to the high-voltage on-board electrical system 10 for maintaining the voltage of the high-voltage on-board electrical system 10. If the electric current flowing is greater than 0.5 A, there is a malfunction, such as a short circuit, for example. If this has been determined, a corresponding notification is output, such that a user of the transportation vehicle 2 can visit a garage. In summary, a malfunction or a fault is identified by the diagnosis. If the voltage rises too quickly compared with what is expected, it is assumed that one of the lines of the high-voltage on-board electrical system 10 is disconnected. If the voltage rises too slowly, it is assumed that there are excessive capacitances, in particular, that there is a short circuit. If the voltage is kept stable by the DC-to-DC converter 20, the resulting electric current is ascertained, with the result that an impermissible load can be identified, wherein in the presence of a short circuit has already been ruled out.

The disclosure is not restricted to the exemplary embodiment described above. Rather, other embodiments can also be derived therefrom by a person skilled in the art without departing from the subject matter of the disclosure. In particular, all the individual features described in connection with the individual exemplary embodiments can also be combined with one another in another manner without departing from the subject matter of the disclosure.

LIST OF REFERENCE SIGNS

2 Transportation vehicle
4 Wheel
6 Body
8 Main drive
10 High-voltage on-board electrical system
12 First auxiliary unit
14 Charging connection
16 Connection unit
18 Charging contactor
20 DC-to-DC converter
22 Low-voltage on-board electrical system
24 Second auxiliary unit
26 Battery
28 Battery unit
30 Switching unit
32 Connection
34 Contactor
36 Fuse
38 Subregion
40 Battery module
42 Battery cell
44 Lower connection
46 Interconnection unit
48 Switch
50 Control device
52 Computer
54 Storage unit
56 Computer program product
58 Method
60 First work operation
62 Second work operation
64 Third work operation
66 Fourth work operation
68 Fifth work operation
70 Sixth work operation

The invention claimed is:

1. A transportation vehicle comprising:
a high-voltage on-board electrical system;
a low-voltage on-board electrical system connected to the high-voltage on-board electrical system by a DC-to-DC converter;
a battery unit that has two subregions electrically connectable in series and in parallel by an interconnection unit,
wherein the high-voltage on-board electrical system is connected by a switching unit to the battery unit, and
wherein the switching unit is opened, the subregions are connected electrically in parallel by the interconnection unit, electrical energy is channeled from the high-voltage on-board electrical system to the low-voltage on-board electrical system by the DC-to-DC converter, resulting in reduction of the voltage of the high-voltage on-board electrical system, and the switching unit is closed in response to the voltage of the high-voltage on-board electrical system differing from the voltage present at the battery unit by no more than a tolerance value.

2. The vehicle of claim 1, wherein a speed of the energy transfer by the DC-to-DC converter is reduced in response to the voltage of the high-voltage on-board electrical system approaching the voltage present at the battery unit.

3. The vehicle of claim 1, wherein electrical energy is channeled from the high-voltage on-board electrical system to the low-voltage on-board electrical system by the DC-to-DC converter until the voltage of the high-voltage on-board electrical system is lower than the voltage present at the battery unit, and wherein electrical energy is subsequently channeled from the low-voltage on-board electrical system to the high-voltage on-board electrical system by the DC-to-DC converter, resulting in the voltage of the high-voltage on-board electrical system rising again.

4. The vehicle of claim 3, wherein electrical energy is channeled from the low-voltage on-board electrical system to the high-voltage on-board electrical system by the DC-to-DC converter until the switching unit is closed.

5. The method of claim 4, wherein a diagnosis is carried out based on the resulting electric current from the low-voltage on-board electrical system to the high-voltage on-board electrical system.

6. The vehicle of claim 1, wherein the high-voltage on-board electrical system is established with a charging connection after the switching unit is closed.

7. A method for operating a transportation vehicle that includes a high-voltage on-board electrical system and a low-voltage on-board electrical system connected by a DC-to-DC converter, wherein the high-voltage on-board electrical system is connected by a switching unit to a battery unit that has two subregions able to be connected electrically in series and electrically in parallel by an interconnection unit, the method comprising:
opening the switching unit;
electrically connecting the subregions in parallel by the interconnection unit;
channeling electrical energy from the high-voltage on-board electrical system to the low-voltage on-board electrical system by the DC-to-DC converter, wherein the channeling results in reduction of the voltage of the high-voltage on-board electrical system; and closing the switching unit in response to the voltage of the high-voltage on-board electrical system differing from the voltage present at the battery unit by no more than a tolerance value.

8. The method of claim 7, further comprising reducing a speed of the energy transfer by the DC-to-DC converter in response to the voltage of the high-voltage on-board electrical system approaching the voltage present at the battery unit.

9. The method of claim 7, wherein electrical energy is channeled from the high-voltage on-board electrical system to the low-voltage on-board electrical system by the DC-to-DC converter until the voltage of the high-voltage on-board electrical system is lower than the voltage present at the battery unit, and wherein electrical energy is subsequently channeled from the low-voltage on-board electrical system to the high-voltage on-board electrical system by the DC-to-DC converter, resulting in the voltage of the high-voltage on-board electrical system rising again.

10. The method of claim 9, wherein electrical energy is channeled from the low-voltage on-board electrical system to the high-voltage on-board electrical system by the DC-to-DC converter until the switching unit is closed.

11. The method of claim 10, wherein a diagnosis is carried out based on the resulting electric current from the low-voltage on-board electrical system to the high-voltage on-board electrical system.

12. The method of claim 7, wherein the high-voltage on-board electrical system is established with a charging connection after the switching unit is closed.

13. A non-transitory computer readable medium comprising a computer program that includes instructions that, when the program is executed by a computer, cause the computer to perform the method of claim 7.

14. The non-transitory computer readable medium of claim 13, wherein, the method further comprises reducing a speed of the energy transfer by the DC-to-DC converter in response to the voltage of the high-voltage on-board electrical system approaching the voltage present at the battery unit.

15. The non-transitory computer readable medium of claim 13, wherein, in the method, electrical energy is channeled from the high-voltage on-board electrical system to the low-voltage on-board electrical system by the DC-to-DC converter until the voltage of the high-voltage on-board electrical system is lower than the voltage present at the battery unit, and wherein electrical energy is subsequently channeled from the low-voltage on-board electrical system to the high-voltage on-board electrical system by the DC-to-DC converter, resulting in the voltage of the high-voltage on-board electrical system rising again.

16. The non-transitory computer readable medium of claim 15, wherein, in the method, electrical energy is channeled from the low-voltage on-board electrical system to the high-voltage on-board electrical system by the DC-to-DC converter until the switching unit is closed.

17. The non-transitory computer readable medium of claim 16, wherein, in the method, a diagnosis is carried out based on the resulting electric current from the low-voltage on-board electrical system to the high-voltage on-board electrical system.

18. The non-transitory computer readable medium of claim 13, wherein, in the method, the high-voltage on-board electrical system is established with a charging connection after the switching unit is closed.

* * * * *